United States Patent [19]

Jennings et al.

[11] Patent Number: 4,471,965
[45] Date of Patent: Sep. 18, 1984

[54] HIGH-PRESSURE FIRE-RESISTANT METAL SEAL

[75] Inventors: Charles E. Jennings; Thomas N. Treue, both of Houston; Bashir M. Koleilat, Spring, all of Tex.

[73] Assignee: FMC Corporation, Chicago, Ill.

[21] Appl. No.: 375,165

[22] Filed: May 5, 1982

[51] Int. Cl.³ .................. F16J 15/08; F16J 15/32
[52] U.S. Cl. ............................ 277/26; 277/105; 277/167.5; 277/152; 277/236
[58] Field of Search .............. 277/105, 106, 167.5, 277/205, 206 R, 152, 153, 212 R, 212 C, 26, 214, 236; 285/336, DIG. 18

[56] References Cited

U.S. PATENT DOCUMENTS

| 1,819,036 | 8/1931 | Oberhuber | 277/236 X |
| 2,405,152 | 8/1946 | Kilchenmann | 277/236 X |
| 2,660,493 | 11/1953 | Flick | 277/212 R X |
| 2,761,707 | 9/1956 | Herman | 277/236 X |
| 3,003,795 | 10/1961 | Lyon | 277/236 X |
| 3,047,301 | 7/1962 | Taylor et al. | 277/117 |
| 3,291,506 | 12/1966 | Blakeley | 277/206 R X |
| 3,298,719 | 1/1967 | Bills et al. | 285/336 |
| 3,373,998 | 3/1968 | Bialkowski | 277/236 X |
| 3,455,562 | 7/1969 | Burtis | 277/236 X |
| 3,490,777 | 1/1970 | Emmerson | 277/206 |
| 3,915,462 | 10/1975 | Bruns et al. | 277/190 |
| 4,153,283 | 5/1979 | Hellmund et al. | 285/334 |
| 4,214,763 | 7/1980 | Latham | 277/236 X |
| 4,281,841 | 8/1981 | Kim et al. | 277/236 |

FOREIGN PATENT DOCUMENTS

| 901976 | 1/1954 | Fed. Rep. of Germany | 277/153 |
| 1203067 | 10/1965 | Fed. Rep. of Germany | 277/236 |
| 1356218 | 2/1964 | France . | |
| 1486690 | 5/1967 | France . | |
| 2244106 | 7/1974 | France . | |
| 590139 | 7/1947 | United Kingdom | 277/26 |
| 724810 | 2/1955 | United Kingdom . | |
| 917726 | 2/1963 | United Kingdom . | |
| 1355190 | 6/1974 | United Kingdom | 277/26 |
| 2000234 | 1/1979 | United Kingdom | 277/152 |
| 609012 | 5/1978 | U.S.S.R. | 277/236 |

Primary Examiner—Robert S. Ward
Attorney, Agent, or Firm—W. William Ritt, Jr.; Richard B. Megley

[57] ABSTRACT

A multi-purpose metal-to-metal seal system providing fluid-tight integrity at the area of contact between the seal element and the surface against which it bears, throughout wide variations in pressure and temperature, and especially during and following exposure to a fire atmosphere.

12 Claims, 9 Drawing Figures

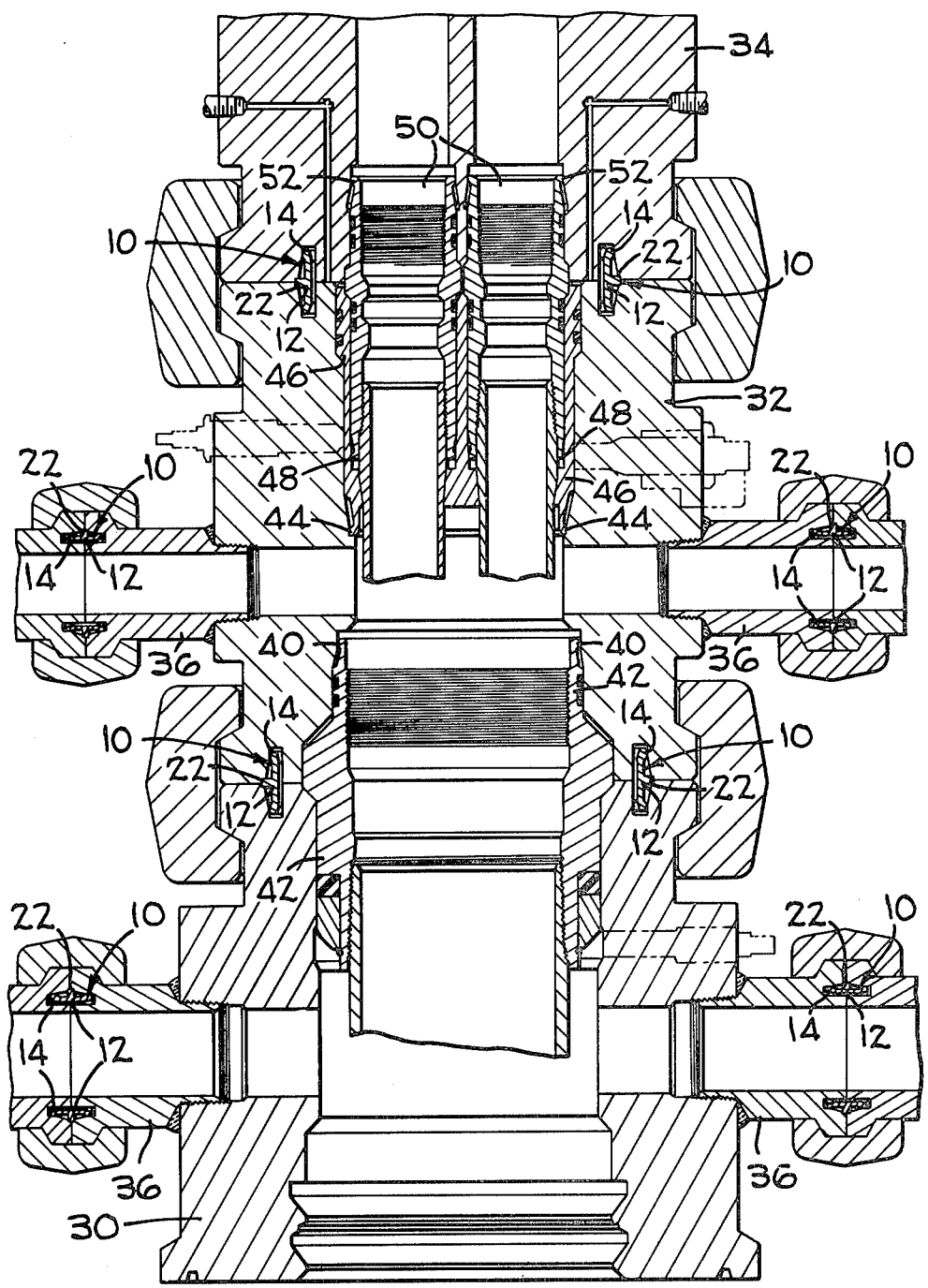
FIG_1

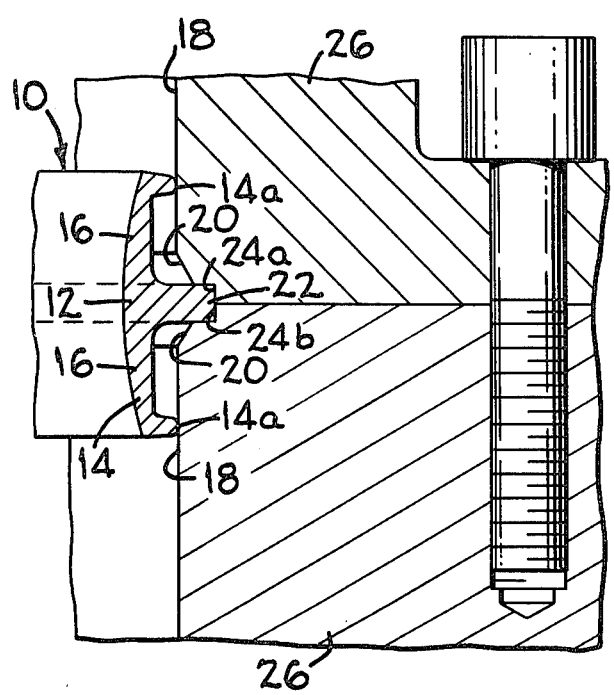
FIG_2
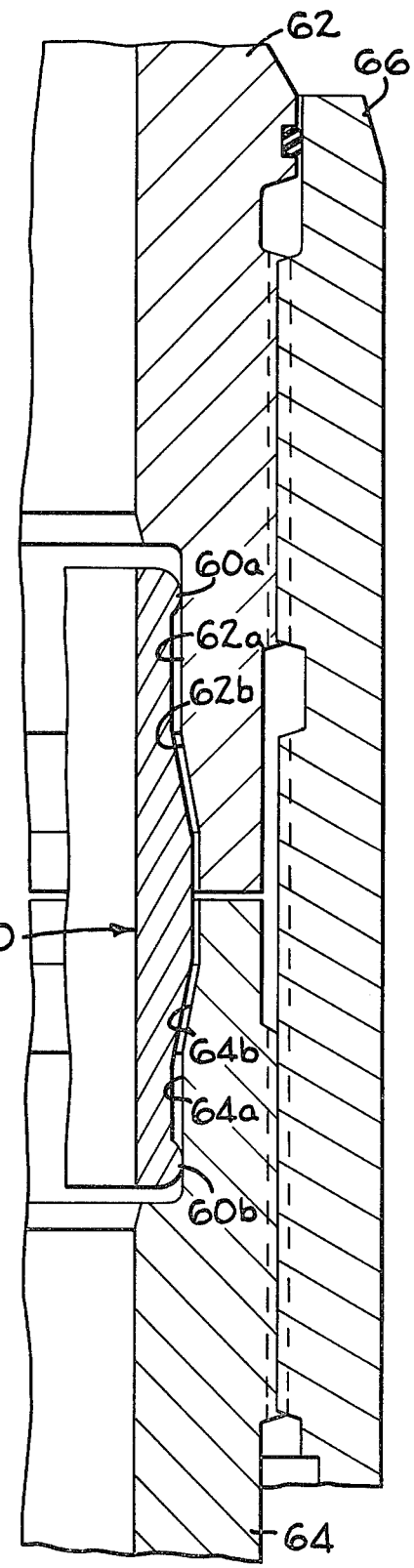
FIG_3

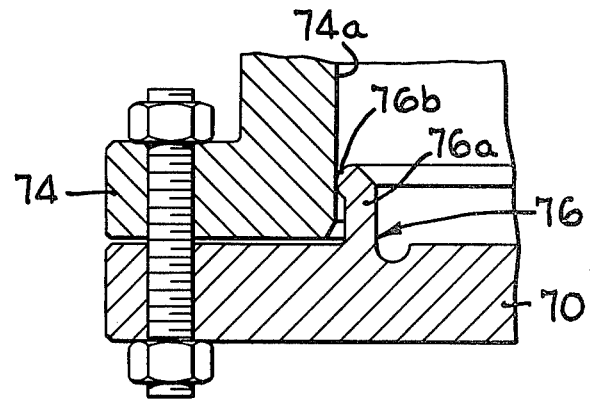
FIG_4
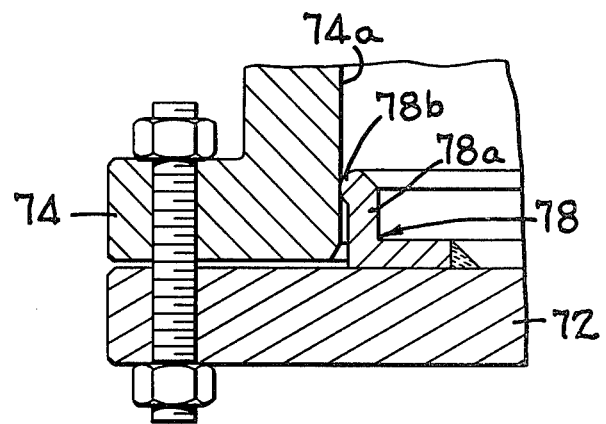
FIG_5
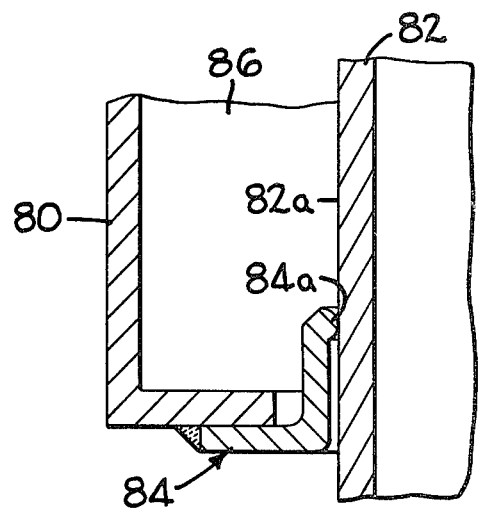
FIG_6

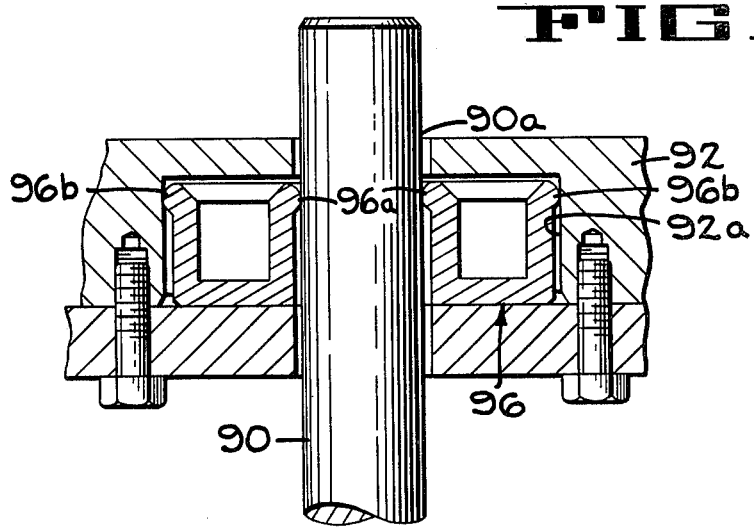
FIG_7
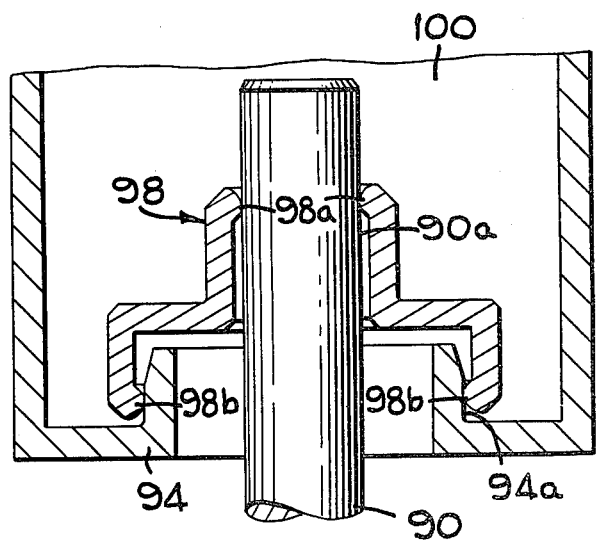
FIG_8
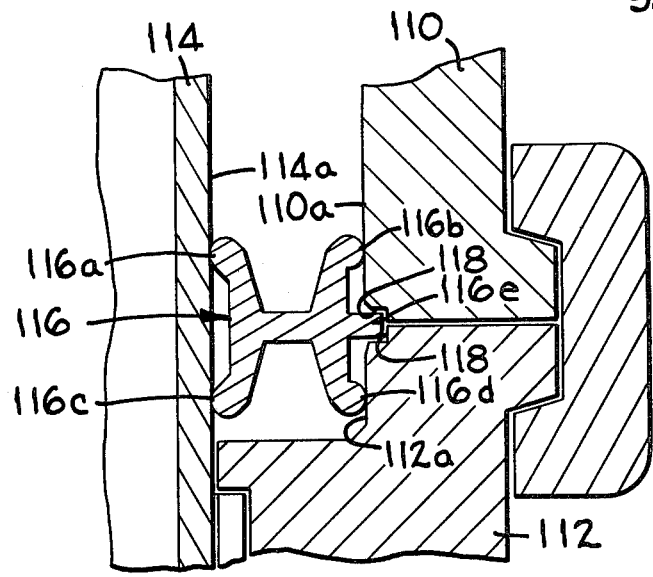
FIG_9

HIGH-PRESSURE FIRE-RESISTANT METAL SEAL

BACKGROUND OF THE INVENTION

This invention relates to fluid seal systems, and more particularly to such seal systems involving a metal seal element that bears against a metallic surface to establish a metal-to-metal sealing interface preventing the passage of pressurized fluid.

The use of metal-to-metal seal systems for containing pressurized fluids is a time-honored and generally satisfactory practice in many fields. One field in which this practice has found considerable acceptance is the oil and gas industry, and especially in well drilling and completing operations. During these operations various well-head equipment is utilized to maintain control over the fluids and pressures encountered in the well, and where offshore wells are concerned the ability of this equipment to function in a reliable and safe manner is of paramount importance.

Fire is a dangerous potential at all oil and gas well sites, and because of the high cost of fire damage, particularly at offshore locations, and the increase in multi-well platforms at those locations fire-resistant well-head equipment is being specified on an escalating frequency. These factors have caused a corresponding increase in stringent standards for fire-resistant equipment, and efforts to comply with these demanding specifications have resulted in the invention described below.

SUMMARY OF THE INVENTION

Broadly considered, the present invention comprises a metal-to-metal sealing system including an annular metallic seal element having a sealing lip with a sealing face of round or curved, as distinguished from annular or flat, cross-sectional configuration, and a cylindrical metallic surface against which the sealing lip presses in a fluid-tight relationship. The cylindrical surface has a lead-in chamfer on at least one end to facilitate installation of the seal element into an interference fit against the cylindrical surface, and that surface has sufficient axial length to accomodate relative longitudinal movement between it and the sealing lip as these metallic elements expand and contract in response to changes in temperature. Thus under normal operating conditions such as those existing at times other than during a fire, the seal system functions as a pre-load metal-to-metal seal, and when subjected to a fire or other greatly elevated temperature the interference fit assures that a fluid-tight seal is maintained even though significant longitudinal or radial movement between the sealing lip and the cylindrical surface occurs. Furthermore, during cool down from high temperatures the integrity of the seal remains intact. The result is an effective and reliable metal-to-metal sealing system which provides fluid-tight pressure control over a very wide temperature range, for example from 1200° F. to minus 75° F., and which can be satisfactorily employed in wellhead equipment as well as other applications where varying temperatures and/or pressures may be encountered.

BRIEF DESCRIPTION OF THE DRAWINGS

FIG. 1 is a fragmentary vertical section of a wellhead assembly for an oil well, showing several uses of a metal-to-metal sealing system according to the present invention.

FIG. 2 is a fragmentary section, on an enlarged scale, of a sealing system according to the present invention employed to provide a metal-to-metal seal between a valve bonnet and a valve body, or between two line flanges or other flanged annular elements such as illustrated in FIG. 1.

FIG. 3 is an enlarged fragmentary section of a metal-to-metal seal according to the present invention between two pipes interconnected by an external pipe coupling.

FIGS. 4 and 5 are enlarged fragmentary sections of a blind pipe flange secured to a pipe end and a metal-to-metal seal of the present invention providing a fluid-tight seal therebetween.

FIG. 6 is an enlarged fragmentary section of another embodiment of metal-to-metal seal according to the present invention, wherein the seal element surrounds a cylindrical metal surface.

FIG. 7 illustrates another embodiment of the present invention wherein a metal seal element of generally U-shaped configuration (in cross-section) is employed to provide a metal-to-metal seal between a cylindrical shaft and a surrounding annular member.

FIG. 8 illustrates yet another embodiment of the present invention wherein a generally step-shaped metal seal element provides a metal-to-metal seal between two cylindrical surfaces which it surrounds.

FIG. 9 illustrates still another embodiment of the present invention wherein a metal seal element with four sealing lips establishes a metal-to-metal seal between an inner cylindrical surface and two outer cylindrical surfaces.

DESCRIPTION OF THE PREFERRED EMBODIMENT

In reference to FIGS. 1 and 2, and as best seen in FIG. 2, a metal-to-metal sealing system according to the present invention comprises an annular metal seal element 10 with a base portion 12, a sealing lip 14 with a round or generally curved sealing face 14a, and an intermediate portion 16 interconnecting the base portion and the lip, and a cylindrical metal surface or wall 18 against which the lip 14 presses in an interference fit relationship when the seal element is in functional position. A lead-in chamfer 20 on the cylindrical metal surface 18 provides a means to install the metal seal element 10 into its illustrated functional position, and the cylindrical surface 18 has an axial length adequate to assure that the face 14a of the seal element is always in contact with that surface 18 regardless of relative movement therebetween in response to temperature fluctuations.

In this embodiment of the present invention the seal element 10 also has a central web portion 22 that extends outwardly from the base portion 12 to fit into relieved areas 24a, 24b in the adjacent faces of annular flanges 26, for properly positioning the seal element and retaining it in that location. These flanges 26 can be terminal portions of wellhead elements as seen in FIG. 1; for example, the flanges 26 can be attached to a casing head 30, a tubing head 32, a block valve 34, or annulus outlets 36.

As further indicated in FIG. 1, the metal-to-metal sealing system of the present invention also can be in a wellhead as (1) an annulus seal 40 between a mandrel casing hanger 42 and the tubing head 32, (2) a bushing seal 44 between an annular hanger bushing 46 and the tubing head 32, (3) an annulus seal 48 for tubing hanger couplings 50 in a dual tubing string completion system, and (4) an extended neck hanger seal as shown at 52.

Since the sealing face 14a of the seal element's lip 14 is round or curved in configuration it does not cause damage to the cylindrical surface against which it presses when in functional position. This rounded sealing face 14a also allows minor axial misalignment between the seal element and cooperative cylindrical surface, such as for example between a tubing hanger and the adapter element, to be accommodated.

Tests on wellhead equipment utilizing a metal-to-metal seal system according to the present invention have shown that the surface finish at the area of contact between the seal element and the cylindrical surface can be as rough as 125 micro-inches R.M.S. without jeopardizing the fluid-tightness of the seal. This advantage contrasts significantly with the highly polished surfaces required in some other metal-to-metal seal systems, and provides cost-reduction opportunities in the manufacturing process.

Additional advantages provided by the present invention include (1) the fact that the cylindrical configuration of the surface against which the seal element's lip presses is substantially easier to manufacture than surfaces of other configurations, such as conical, heretofore employed in other metal-to-metal seal systems, and (2) no special bolting or clamping arrangements are necessary.

DESCRIPTION OF THE OTHER EMBODIMENTS

FIG. 3 illustrates a dual metal-to-metal seal system according to the present invention, wherein an annular metal seal element 60 with two round sealing lips 60a, 60b provides a fluid-tight seal between two adjacent pipe ends 62, 64 that are secured together by an outer annular pipe coupling 66 into which the pipe ends are threaded. The internal end surfaces 62a, 64a of the pipe ends are cylindrical, and annular chamfers 62b, 64b facilitate installation of the seal element into an interference fit within the surfaces 62a, 64a.

FIGS. 4 and 5 illustrate the use of a metal-to-metal seal system of the present invention for sealing blind flanges 70 and 72 to a flanged end 74 of a pipe. In the FIG. 4 embodiment the seal element 76 is integral with the flange 70, whereas in FIG. 5 the element 78 is formed separately and then welded or otherwise fixed to the flange 72. In both embodiments the rounded faces 76b, 78b of the seal element lips 76a, 78a fit in an interference relationship against the inner cylindrical surface 74a of the pipe 74.

FIG. 6 illustrates the use of a metal-to-metal seal system of the present invention to establish a fluid-tight barrier between an outer annular element 80 and an inner pipe or other annular element 82. The annular metal seal element 84 is shown as welded to the outer element 80, and the seal's rounded lip surface 84a presses against the outer cylindrical surface 82a of the inner element 82, thereby containing the pressure in the annulus 86.

FIGS. 7 and 8 illustrate two versions of a dual metal-to-metal seal in accordance with the present invention, both for sealing an inner cylindrical rod, axle, shaft, or the like 90 to an outer annular element 92 (FIG. 7) and 94 (FIG. 8).

The generally U-shaped (in cross-section) annular seal element 96 of FIG. 7 has inner and outer sealing lips 96a, 96b each with rounded surfaces that press against cylindrical surfaces 90a and 92a, respectively, to establish a fluid-tight barrier between the elements 90, 92.

In the FIG. 8 embodiment the annular metal seal element 98 is generally step-shaped in cross-section, and the sealing lips 98a, 98b are rounded where they contact the cylindrical surfaces 90a, 94a, respectively, in an interference fit relationship. Accordingly, fluid pressure in the annulus 100 is retained between the rod 90 and the outer element 94.

FIG. 9 illustrates yet another embodiment of metal-to-metal seal system according to the present invention, herein of an arrangement to seal between two outer annular elements 110, 112 surrounding an inner annular element 114. In this embodiment the annular seal element 116 includes four sealing lips 116a, 116b, 116c and 116d each with a rounded surface for engaging a cylindrical surface such as 114a, 110a and 112a in an interference fit manner, and an outwardly extending annular web 116e that cooperates with a groove 118 formed by opposed relieved areas in the end faces of elements 110, 112 to retain the seal element 116 in proper, functional position.

Although the best mode contemplated for carrying out the present invention has been herein shown and described, it will be apparent that modification and variation may be made without departing from what is regarded to be the subject matter of the invention.

We claim:

1. In a wellhead assembly for an oil or gas well, a fire-resistant metal-to-metal fluid seal system for isolating fluids subjected to cyclic variations in temperature and/or pressure, said system comprising:
   a. a pipe suspension element with an end portion functional as an annular metal seal element having
      (1) a base,
      (2) a sealing lip with a sealing face of curved cross-sectional configuration, and
      (3) an intermediate lip-supporting portion extending between the base and the sealing lip; and
   b. a wellhead element surrounding said pipe suspension element and having a metallic cylindrical surface against which said sealing lip presses in an interference fit relationship when in functional position therewith, said cylindrical surface having an axial dimension sufficient to assure continuous contact thereof with said sealing lip regardless of the magnitude of expansion and contraction experienced by the seal system in response to temperature and/or pressure fluctuations.

2. A wellhead assembly according to claim 1 wherein the seal element has at least one sealing lip.

3. A wellhead assembly according to claim 2 wherein the wellhead element includes a frusto-conical surface intersecting the metallic cylindrical surface, said frusto-conical surface functioning as a lead-in chamber for installation of said seal element.

4. A metal-to-metal seal system according to claim 1 wherein the seal element has a plurality of sealing lips.

5. A metal-to-metal seal system according to claim 4 wherein the seal element has two sealing lips disposed for establishing a fluid-tight seal with two separate cylindrical surfaces.

6. A metal-to-metal seal system according to claim 5 wherein the seal element includes a web portion intermediate the two sealing lips to locate and retain said seal element in functional position with respect to the cylindrical surfaces.

7. A metal-to-metal seal system according to claim 4 wherein the seal element has a generally U-shaped cross-sectional configuration, and inner and outer sealing lips for establishing a fluid seal in the annulus between two concentric cylindrical surfaces.

8. A metal-to-metal seal system according to claim 4 wherein the seal element has a generally step-shaped cross-sectional configuration, and inner and outer sealing lips disposed to provide a fluid seal between two coaxial cylindrical surfaces.

9. A metal-to-metal seal system according to claim 4 wherein the seal element has a generally H-shaped cross-sectional configuration, and at least three sealing lips to provide a fluid seal with at least three separate cylindrical surfaces.

10. A metal-to-metal seal system according to claim 9 wherein the seal element has four sealing lips, two disposed to sealingly engage one or more outer cylindrical surfaces surrounding said seal element, and two disposed to sealingly engage one or more inner cylindrical surfaces surrounded by said seal element.

11. A metal-to-metal seal system according to claim 10 wherein the seal element further includes a web portion to locate and retain seal seal element in proper functional position.

12. A metal-to-metal seal system according to claim 1 wherein the metallic cylindrical surface also has a lead-in chamfer to facilitate installation of the seal element into sealing engagement therewith.

* * * * *